US012001666B2

(12) United States Patent
Rauen

(10) Patent No.: US 12,001,666 B2
(45) Date of Patent: Jun. 4, 2024

(54) HIERARCHICAL PROFILE BASED SETTINGS

(71) Applicant: madVR Labs LLC, Rockville, MD (US)

(72) Inventor: Mathias Rauen, Hamburg (DE)

(73) Assignee: madVR Labs LLC, Rockville, MD (US)

( * ) Notice: Subject to any disclaimer, the term of this patent is extended or adjusted under 35 U.S.C. 154(b) by 0 days.

(21) Appl. No.: 17/962,127

(22) Filed: Oct. 7, 2022

(65) Prior Publication Data

US 2023/0112823 A1 Apr. 13, 2023

Related U.S. Application Data

(60) Provisional application No. 63/253,354, filed on Oct. 7, 2021.

(51) Int. Cl.
*G06F 3/04847* (2022.01)
*G06F 3/0482* (2013.01)

(52) U.S. Cl.
CPC ........ *G06F 3/04847* (2013.01); *G06F 3/0482* (2013.01)

(58) Field of Classification Search
CPC ............................ G06F 3/0482; G06F 3/04847
See application file for complete search history.

(56) References Cited

U.S. PATENT DOCUMENTS

| | | | | |
|---|---|---|---|---|
| 2002/0036623 A1* | 3/2002 | Kano | ..................... | G06F 3/0481 345/179 |
| 2009/0183100 A1* | 7/2009 | Eom | .................... | G06F 3/04883 715/769 |
| 2009/0327964 A1* | 12/2009 | Mouilleseaux | ..... | G06F 3/04883 715/834 |
| 2012/0056910 A1* | 3/2012 | Safaee-Rad | .......... | G09G 3/3406 345/77 |
| 2012/0226978 A1* | 9/2012 | Harberts | ............... | G06F 3/0485 715/702 |
| 2013/0142362 A1* | 6/2013 | Lynn | ...................... | G06F 3/0436 381/109 |
| 2017/0269687 A1* | 9/2017 | Hussain | ................ | G06F 3/0485 |
| 2018/0095611 A1* | 4/2018 | Kuscher | ................ | G06F 3/0482 |
| 2019/0174070 A1* | 6/2019 | Jang | ........................ | H04N 7/185 |
| 2020/0051289 A1* | 2/2020 | Sharma | ................. | G06F 40/103 |
| 2021/0312773 A1* | 10/2021 | Debnath | ................ | G06V 20/46 |
| 2021/0397847 A1* | 12/2021 | Jayaram | ........... | H04N 21/44008 |

* cited by examiner

*Primary Examiner* — Seth A Silverman
(74) *Attorney, Agent, or Firm* — Schwegman Lundberg & Woessner, P.A.

(57) ABSTRACT

A computer implemented method includes receiving video content to display on a display device, applying a sequence of video processing and display settings profiles to base settings to derive video processing and display setting values, processing the video via the computer in accordance with the video processing setting and display setting values, and providing the processed video to the display device.

19 Claims, 13 Drawing Sheets

Upscaling & Sharpening

| Image Upscaling | Sharp |
| Edge Crispening | Off |
| Adaptive Sharpening | Off |
| Detail Enhancement | Off |
| Add Grain | Off |
| Dither Algo | 0 |

Add a Profile to this Page

Incoming Resolution
Incoming Frame Rate
Incoming Aspect Ratio
Incoming Colorimetry
Incoming Flags
Source Devices
Displays SD (or Lower)
720p (or Lower)
1080p (or Lower)
4K (or Lower)
8K (or Lower)
Other

HIERARCHICAL PROFILE BASED SETTINGS

RELATED APPLICATION

This application claims priority to U.S. Provisional Application Ser. No. 63/253,354 (entitled Hierarchical Profile Based Settings, filed Oct. 7, 2021) which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Many products use "presets" or "memory banks" for settings management. Most readers are likely familiar with this approach—the user configures all the settings in the system how they want, saves the settings to a memory bank, and later recalls the settings this way. While this approach is easy to implement and understand, it has many drawbacks.

For example, assume a user wants different settings per source device, the user watches both SDR and HDR content, and the user wants to use different calibration settings for each content type, e.g., a different 3D LUT or a different output gamut setting. The user might also have an anamorphic lens which the user only wants to move into the light path for scope movies. The user might also want to switch a projector's light source into high power mode when playing 3D movies, but not when playing 2D movies. The user might also want different settings based on the aspect ratio of the movie.

If the user wants to have optimal settings for each of these conditions, in all possible combinations, it will be quite complicated for the user to manage all these different settings.

As one can see, storing separate sets of settings for all the potential combinations can consume significant storage, and managing and selecting the settings quickly becomes unwieldy for anything except the most basic use cases.

BRIEF DESCRIPTION OF THE DRAWINGS

FIG. 12 is a diagram illustrating an example upscaling and sharpening menu having different resolution settings according to an example embodiment.

DETAILED DESCRIPTION

Figure 1:
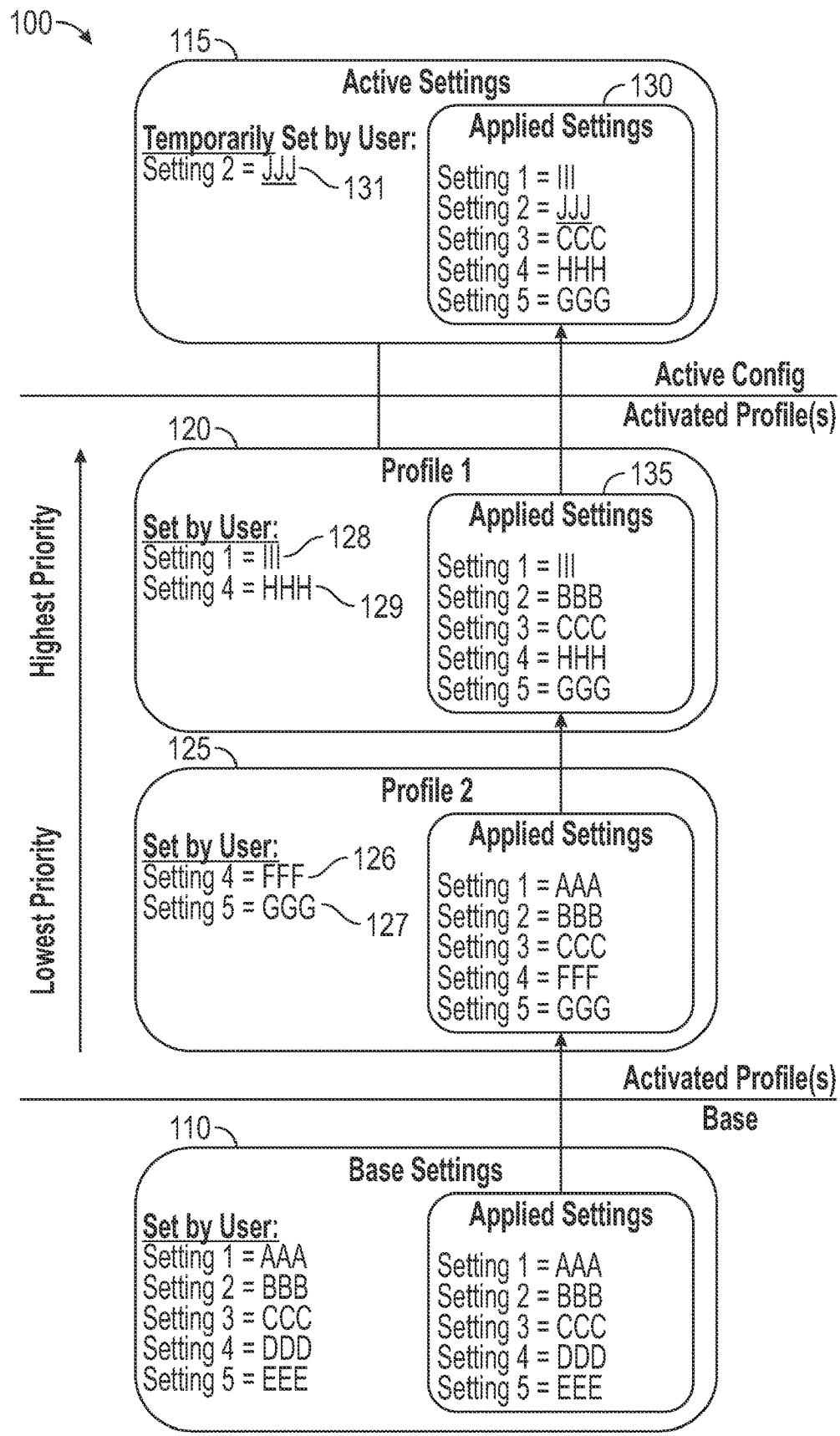
FIG. 1 is an architecture diagram illustrating profile system inheritance for a system having hierarchical setting profiles according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A hierarchical set of settings profiles is used to configure a product. Many different types of products may utilize such sets of settings profiles, such as settings for a driver of a car that can include different settings for the seat position, rear view mirror position, and side view mirror positions. Exercise machines may have multiple different settings in a further example. Any type of product that includes user settings may utilize hierarchical sets of settings profiles.

In one example described in further detail below, the setting profiles are for a video processing and playback system that processes and displays video content. A settings profile is a collection of one or more customized menu pages, with one or more customized settings in those menu pages. Settings profiles are applied as each settings profile is activated, either manually by a user selecting profiles, or automatically. Settings profiles provide a way to group settings and configuration options together, so they can easily be recalled and applied at will. In the video processing playback system, hereinafter system, video processing and display settings and configuration options may be grouped together.

For example, assume that content received from cable TV channels have higher compression artifacts than other sources a user may be using. In this case, the user may want to use stronger artifact reduction settings when watching cable TV than with the other sources. A cable TV settings profile, when activated, enables application of settings that are customized for cable TV when watching content from the cable TV source. Further settings profiles may be created and used for application of different upscaling and sharpening settings for different sources, or even based on a movie's resolution.

Several predefined profiles may be provided, including ones that are activated automatically based on the properties of the incoming video signal, such as its resolution or aspect ratio. Users can also create custom profiles and organize the custom profiles into Profile Groups.

Activated profiles are applied in a hierarchical manner, starting with a base settings profile and progressing through a set order of groups of profiles that may be applied to modify the way video content is processed and displayed. Each consecutively applied profile only changes settings that are specified in the profile being applied. Other settings remain unchanged and may be referred to as inherited settings.

There may also be different types of profiles: Auto-switching profiles and custom/manual profiles for example. The auto switching profiles automatically switch and are applied based on the properties of the incoming video signal as described in further detail below.

The user can create manual profiles and can place them into groups. For such manually created profiles, an example limitation is that only one profile can be active at a time within any given profile group. In one example, such a manually created profile could be to adjust the display's brightness control to the ambient light levels. The user could create a custom profile group named "Ambient Light", and then create 3 profiles in this group named "Sunlight", "Night time—Lamps On" and "Completely Dark". Then, before watching a movie, the user can manually select which of these 3 profiles to activate. Only one profile can be active at a time in this group as "Sunlight" and "Completely Dark" cannot be active at the same time.

The user can create multiple manual profile groups. In each profile group, one (and only one) profile can be active at a time. However, all profile *groups* can be active at the same time. There could be one active profile in the "Ambient Light" manual profile group and another active profile in the "Content Type (Sports vs Movies)" manual profile group. A user may like to avoid having profiles in different groups with conflicting settings. It may be advisable to limit profiles in each group to a different setting or different groups of settings to avoid having a profile from a different group overwrite a setting from a previously applied profile.

A general recommendation is that the user should try to avoid having "conflicting" profile groups. For example, if the user modifies the "motion compensation" option in the "Incoming Frame Rate" profile group, the user should try to avoid changing this option in other profile groups. The user may be allowed to do that, of course, and then a priority order comes into play. Avoiding this situation altogether if possible, can make priority completely irrelevant. The system does not overwrite all options, but only specifically chosen options. It should be easily possible to use dozens or even hundreds or more of different profiles without the profiles conflicting in any way.

In addition to auto profiles and manual/custom profiles there is a 3rd profile type, which is something in between the other two: There are two predefined profile groups called "Source Devices" and "Displays". In one example, a Source Devices profile group could have profiles like "Samsung Blu-Ray Player", "Xbox", "Apple TV" etc. The Displays profile group could have profiles like "Front Projector" and "OLED TV". These two profile groups may be manually selected by users. In further embodiments, the two profile groups may be automatically applied by communicating with the AVR (Audio Video Receiver) via IP Control to learn which HDMI Input in the AVR is currently active to activate the Source Devices profile automatically.

When multiple profile groups are active at the same time, a predetermined group priority may be used to navigate thought the active profiles to modify settings. In one embodiment, there are four different groups of profiles having values for various settings. The groups include: 1) manual/custom profiles; 2) Source Devices; 3) Displays; 4) auto profiles. The priority may be the same as this list, with manual/custom profiles having the highest priority and auto profiles the lowest. To enable this a priority, lowest priority active profiles are applied first to modify the base settings, progressing to the highest priority profiles. This allows the settings in the higher priority profiles to be applied after all active profiles are applied.

Currently, the first created manual profile group has priority over the last created manual profile group. In further embodiments, the priority may be customizable by the user.

The video processing and playback system receives various pieces of information about the incoming video signal. Based on that information, there are a number of predefined "auto profiles" which the user can use to modify any options on any menu page desired. Anything not modified stays unchanged by the profile. Profiles are by nature "transparent", meaning they do not do anything, unless the user asks them to modify one (or multiple) selected option(s).

The key properties of the incoming video signal are sorted into groups. An example list of the predefined auto profiles which automatically activate based on the properties of the incoming video signal includes:

Incoming Resolution (Profile Group)
SD (or Lower)
720p (or Lower)
1080p (or Lower)
4K (or Lower)
8K (or Lower)
Other
Incoming Frame Rate (Profile Group)
24p (or Lower)
25p (or Lower)
30p (or Lower)
48p (or Lower)
50p (or Lower)
60p (or Lower)
72p (or Lower)
100p (or Lower)
120p (or Lower)
Other
Incoming Aspect Ratio (Profile Group)
2.76:1 (or Wider)
2.55:1 (or Wider)
2.39:1 (or Wider)
2.35:1 (or Wider)
2.20:1 (or Wider)
2.00:1 (or Wider)
1.85:1 (or Wider)
16:9 (or Wider)
4:3 (or Wider)
Other
Incoming Colorimetry (Profile Group)
BT.2020 (or Wider)
DCI-P3 (or Wider)
BT.709 (or Wider)
EBU/PAL (or Wider)
SMPTE C (or Wider)
Other
Incoming Flags
SDR (Gamma)
HDR (Gamma)
HDR (PQ)
HDR (HLG)
2D
3D
8 bit
10/12 bit Creation and editing of settings profiles may be performed in the following manner.

1) Let's say in the Base Settings the user has "motion interpolation" turned off. The Base Settings are permanent settings which are stored on the internal SSD non-volatile memory.

2) Now the user can modify the "motion interpolation" option in the Active Settings, which are temporary. This option change becomes active immediately, but isn't stored to the SSD, and gets auto-reset when the movie stops playing.

3) The user now has the option to save the modified "motion interpolation" option to the Base Settings. If the user does, the modified option is stored to the internal SSD, and will permanently stay changed as requested.

4) Alternatively, the user can store the option to a profile instead of to the Base Settings.

5) Let's say the user stores the "motion interpolation→on" option change into the "Incoming Frame Rate→25p (or Lower)" auto profile. Effectively that means that from now on in the future, when the user plays a 24p or 25p movie, motion interpolation automatically gets turned on (coming from the "25p or Lower" profile). If the user plays a 30p or 50p or 60p etc movie, motion interpolation stays off (coming from the Base Settings).

One example hierarchy of settings illustrating profile inheritance is shown below in FIG. 1 at 100. The profiles are applied from the bottom up, starting with the base settings 110, and progressing through the lowest priority to highest priority active settings. A top level of settings includes the active settings 115 that are currently in effect, and any further temporary settings the user may have made. Temporary settings may be saved in one or more profiles for future use:

As shown in FIG. 1, the base settings 110 is the layer where all default values are set and inherited from. The base settings are used globally, unless overridden by settings in an activated profile or by temporary settings.

The Activated Profiles layer shows two profiles, with Profile 1 at 120 having a highest priority and Profile 2 at 125 having a lowest priority. Note that in Profile 2, setting 4=FFF at 126 and setting 5=GGG at 127 are indicated as having been set by the user. In Profile 1, Setting 1=III at 128 and setting 4=HHH at 129 are also indicated as having been set by the user. Both Profiles 1 and 2 set setting 4 to different values. Since Profile 1 has higher priority, setting 4=III will be used as the active setting in the Active Settings 115 layer and will be the settings that are in effect at the current time after application of the prioritized hierarchy of profiles.

In the Active Settings layer 115, the user has temporarily set setting 2=JJJ at 131 in applied settings 130. This setting is not reflected in a set of Applied Settings 135 of Profile 1, along with settings 1, 4, and 5 based on the changes made in profiles having higher priority than the base settings. Setting 3=CCC remains unchanged from the base settings 110.

In one example, a menu system for selection of settings includes multiple menu pages, such as HDR settings and Display Configuration. A profile consists of a group of one or more customized copies of menu pages. In one example, only explicitly set settings in profiles will be applied. Unchanged menu items in a profile are fully transparent and passed through as if non-existent. Profiles may be activated either by manually using a controller such as a remote control, or automatically by the system or via predefined profiles based on an incoming video signal.

In the case of conflicting settings, profiles are applied in the following order or priority from highest to lowest priority—custom profiles created by a user, source device profiles, display profiles, and profiles based on properties of an incoming video signal.

The following information may be provided to a user for facilitating use of the system for processing and displaying video content utilizing hierarchical profiles.

Profiles are used to set and recall a group of settings to be applied for a particular purpose. For example, when watching a movie at 1080p, the user may want different settings than when watching it at 4K. Or when using an Oppo player, the user may want different settings than when using Apple® TV.

As another example, assume TV channels have higher compression artifacts than other sources. The user may want to use stronger artifact reduction settings when watching TV than with the other sources.

The profile system enables infinite, yet easily managed combinations of settings. The system handles everything from the most basic to complex settings management needs, while maintaining exceptional ease of use.

Why Not Just Use "Presets"?

Many products use "presets" or "memory banks" for settings management. Most readers are likely familiar with this approach—the user configures all the settings in the system how they want, saves the settings to a memory bank, and later recalls the settings this way. While this approach is easy to implement and understand, it has many drawbacks.

For example, assume the user wants different settings per source device and that the user watches both SDR and HDR content, and the user wants to use different calibration settings for each content type, e.g., a different 3D LUT or a different output gamut setting. The user might also have an anamorphic lens which the user only wants to move into the light path for scope movies. The user might also want to switch a projector's light source into high power mode when playing 3D movies, but not when playing 2D movies. The user might also want different settings based on the aspect ratio of the movie.

Now if the user wants to have optimal settings for each of these conditions, in all possible combinations, how many memory banks will be needed? Easily over a hundred. In order to change one setting in common with most conditions, many memory banks will need to be updated to replicate the changes. Some might be missed and not updated.

The memory bank approach can quickly become unwieldy for anything except basic use cases. The profile system provides great flexibility without these drawbacks.

Profile System Overview

At the core of the Profile System is the profile itself. Profiles provide a way to recall a group of settings, automatically or manually, for a particular purpose. In this section we take a closer look at the system menu system, what profiles are and how they work, the different types of profiles available, and introduce profile groups.

System Menu Pages

Figures 2, 3:
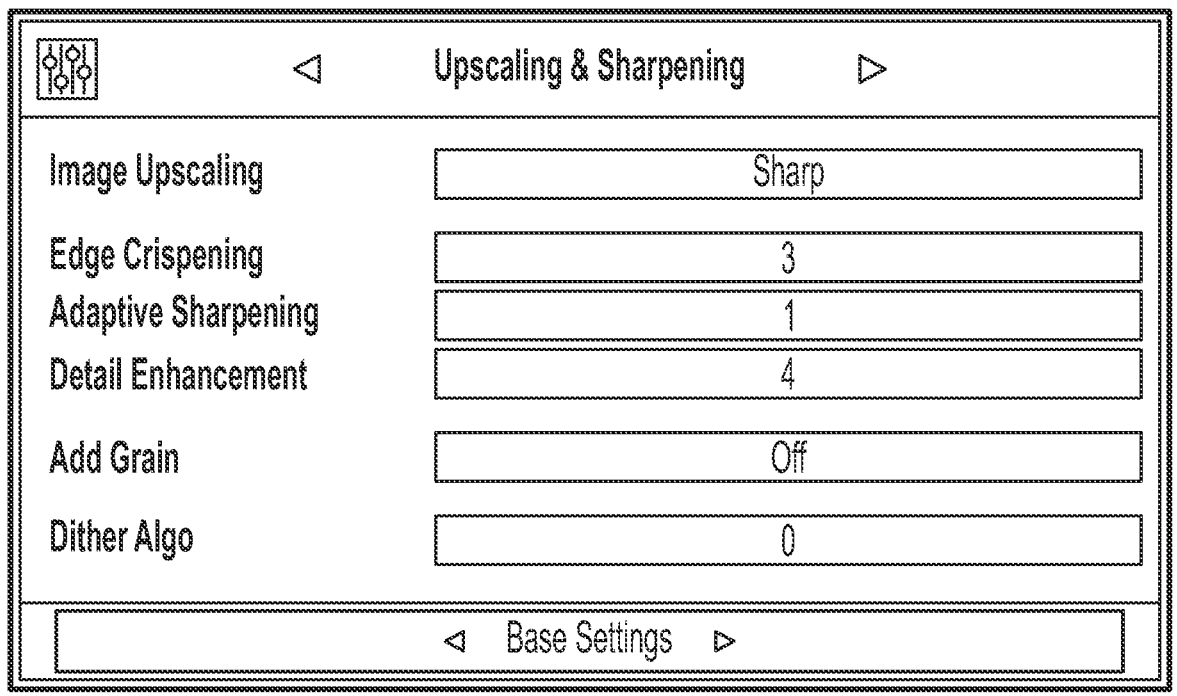
FIG. 2 is a diagram illustrating an upscaling and sharpening menu according to an example embodiment.
FIG. 3 is a diagram illustrating predefine profiles based on an incoming video signal according to an example embodiment.

To fully understand profiles, first consider how the system menu system and its settings are organized. The system menus consist of several individual menu pages grouped by function, each with its own settings. For example, the "HDR Settings" menu page contains only HDR processing preferences, while the "Upscaling & Sharpening" menu page shown at 200 in FIG. 2 contains only upscaling and sharpening related settings.

Profiles—A Custom Collection of Menu Pages

Profiles provide an efficient way to group individual menu settings together, even settings from different menu pages, to override just those settings. For example, a profile can override settings from both the "Upscaling & Sharpening" and the "HDR Settings" menu. Profiles make it possible to apply all desired settings at once for any purpose, simply by activating the profile.

To summarize, profiles are just a collection of one or more menu pages, with one or more customized settings in those menu pages, that overrides those settings only when activated, and without impacting any other settings.

Profile Transparency

Profiles are fully transparent—meaning that when a profile is activated, only the overridden settings in that profile are applied. All system defaults, and any overridden settings from other profiles, simply "pass thru". For example, settings for 3D movies and settings based on an aspect ratio of 2.35 will be automatically applied when watching a 3D movie with an aspect ratio of 2.35.

Each activated profile may be thought of as a "layer". So, if setting A is overridden in profile 1, and setting B is overridden in profile 2, and both profiles are activated, then the settings in effect will be all the system defaults, but with settings A and B overriding those defaults, with any temporary settings applies with highest priority. A discussion of temporary settings is provided below.

Predefined Profiles and Custom Profiles

The system provides several predefined profiles, including ones activated automatically based on the properties of the incoming video signal, such as its resolution, aspect ratio and colorimetry. For example, if you use a predefined profile based on an Incoming Resolution of 1080p or lower, then that profile is automatically activated when the incoming resolution is 1080p or lower and deactivated otherwise. Predefined profiles based on the incoming video signal are below and also illustrated at 300 in FIG. 3.

| | |
|---|---|
| Incoming Resolution> | SD (or Lower) |
| Incoming Frame Rate | 720 p (of Lower) |
| Incoming Aspect Ratio | 1080 p (or Lower) |
| Incoming Colorimetry | 4K (of Lower) |
| Incoming Flags | 8K (or Lower) |
| Source Devices | Other |
| Displays | |

By default, the system also provides predefined profiles for "Source Devices" and "Displays". These are just empty profiles that have no effect until settings are saved to them. The use of profiles is completely optional. If the user does not have any special settings the user wants to use for specific source devices or displays, there is no need to set up profiles for these.

The user can create custom profiles for any purpose you like. For example, the user can create a custom profile called "Sci-Fi" and set all favorites settings for Sci-Fi movies in the Sci-Fi custom profile. Then when the user watches a Sci-Fi movie, The Sci-Fi profile may be activated by the user.

The System Profile Menu

Custom profiles, Source Device profiles, and Display profiles are created, renamed, deleted, and activated by using the Profile menu. To access the Profile menu, press the Profile button on the Envy remote (the button with a square and arrow).

The user can also activate and manage profiles and profile groups automatically using a control system like Crestron, RTI, Control4 and Savant, or even using a custom program the user create and run on the same network, by using a system IP Control API.

Tip: The system in one example may not provide "hunt and peck" keyboard entry with the remote control. Therefore, to customize the names of profiles and profile groups, a keyboard may be attached to the system via a USB port, or wirelessly.

Figure 4:
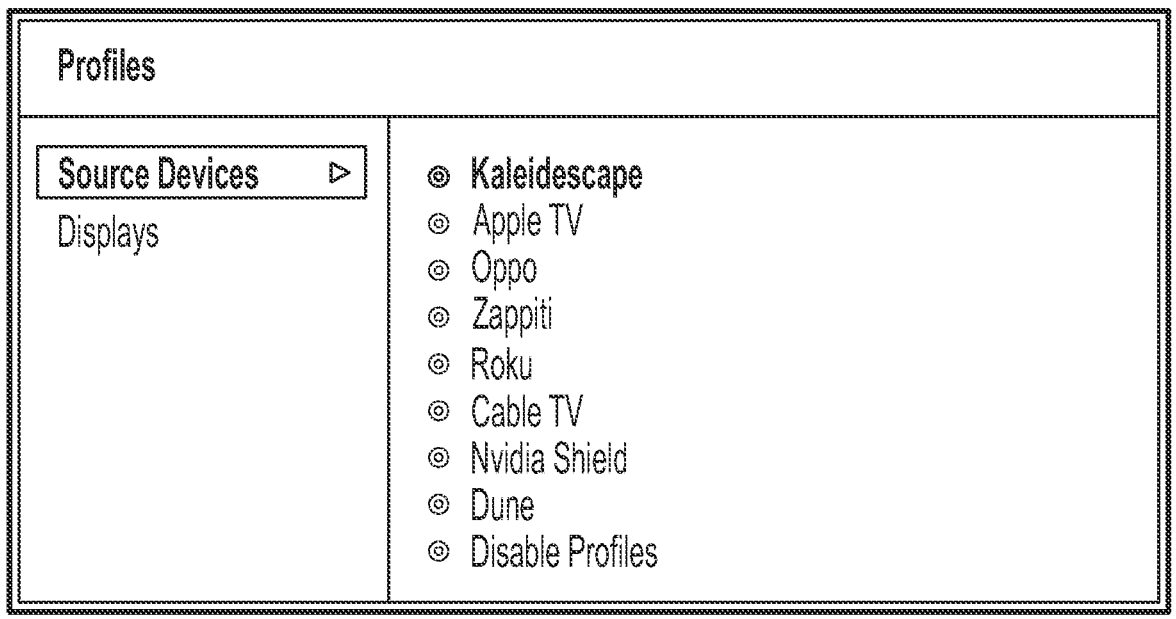
FIG. 4 is a diagram illustrating a profile menu with customized source devices according to an example embodiment.

An example from the profile menu with customized Source Devices is shown at 400 in FIG. 4.

Getting Organized with Profile Groups

Figure 5:
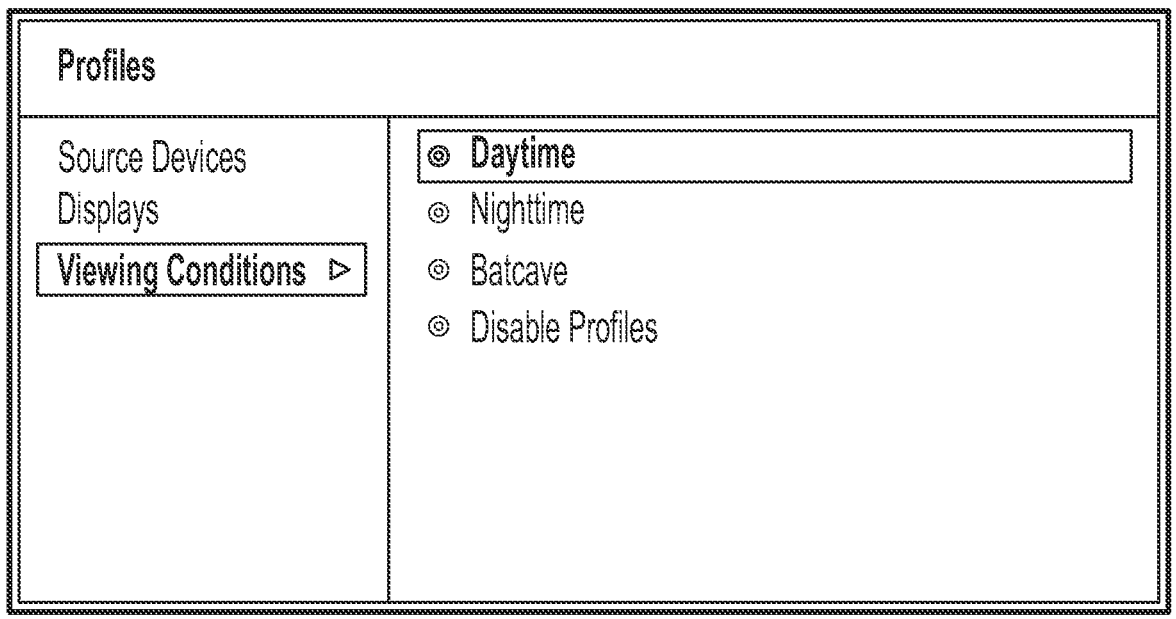
FIG. 5 is a diagram illustrating a profile menu with viewing conditions according to an example embodiment.

To help the user organize profiles, the system provides profile groups. The intended use is to have one profile group for each general purpose, with one or more profiles assigned to the group. For example, the user could create custom profiles called Daytime, Nighttime and Batcave, with user preferred settings for each, and place these profiles into a custom profile group you create named "Viewing Conditions", as shown at 500 in FIG. 5.

"Source Devices" and "Displays", covered earlier, are really just predefined profile groups. Likewise, profiles based on the incoming video signal also organized into profile groups for the user.

Only one profile at a time can be active within a profile group. With the "Viewing Conditions" example, the user can see how this is the intended behavior, as these viewing conditions are mutually exclusive (e.g., the user would not want to use Daytime and Nighttime profiles at the same time). Therefore, activating a profile in a profile group automatically deactivates the other profiles in the same group.

Profile groups are completely arbitrary. The user may create as many profiles and profile groups as desired. Different settings may be used when watching hockey, basketball, and football by creating profiles called "Hockey", "Basketball" and "Football", configuring the desired settings for each, and placing these profiles into a custom profile group named "Sports".

Profiles in Action

Base Settings, the Profile Bar, menu tags, temporary settings, are used to form the Active Settings.

Base Settings

At the root of the system settings management is the "Base Settings" layer, where all default values are set and inherited from. The Base Settings are used globally, unless overridden by settings in an activated profile, or by temporary settings.

Figure 6A:
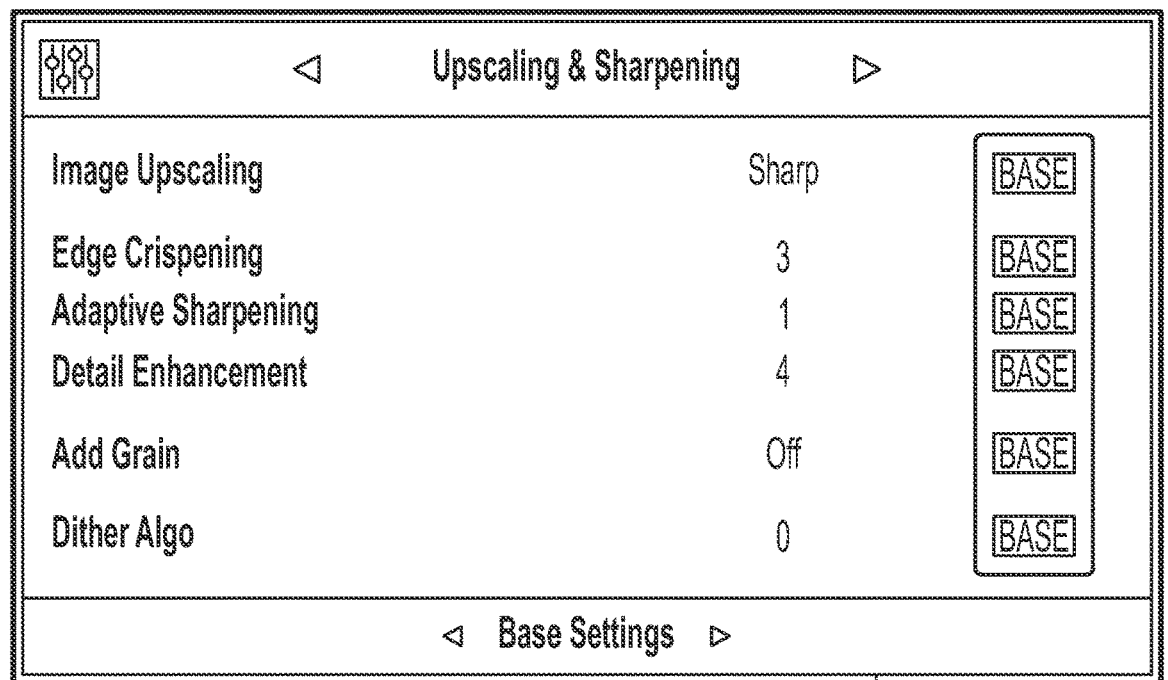
FIG. 6A is a diagram illustrating an upscaling and sharpening menu with base settings according to an example embodiment.

FIG. 6A at 600 is an example of Base Settings defined for Upscaling & Sharpening. These settings are therefore the defaults that the system will use for Upscaling & Sharpening, regardless of resolution, source device, or any other condition—unless overridden.

The area highlighted in the menu page shown at 605 is the Profile Bar. Since the Base Settings option is selected in the profile bar, the menu values shown here reflect the Base Settings.

Profile Bar

The Profile Bar is used to select whether the currently displayed menu settings are for the Base Settings, the Active Settings, or a specific profile. Therefore, the Profile Bar will always contain a selection for at least the Base Settings and Active Settings, and for each profile (if any) that the menu page has been added to.

In FIG. 6A, the menu settings shown are for the Base Settings 605, since "Base Settings" is selected in the Profile Bar. Any changes made to these menu options while "Base Settings" is selected in the Profile Bar will therefore be applied to the Base Settings (and hence become the new system defaults).

The system may have both "Settings" menu pages and "Configuration" menu pages. There is no difference between "Active Settings" vs "Active Configuration", or between "Base Settings" vs "Base Configuration" that a user may see in the Profile Bar. These are simply different labels for the same thing, depending on the type of menu page being viewed.

Active Settings and Menu Tags

Figure 6B:
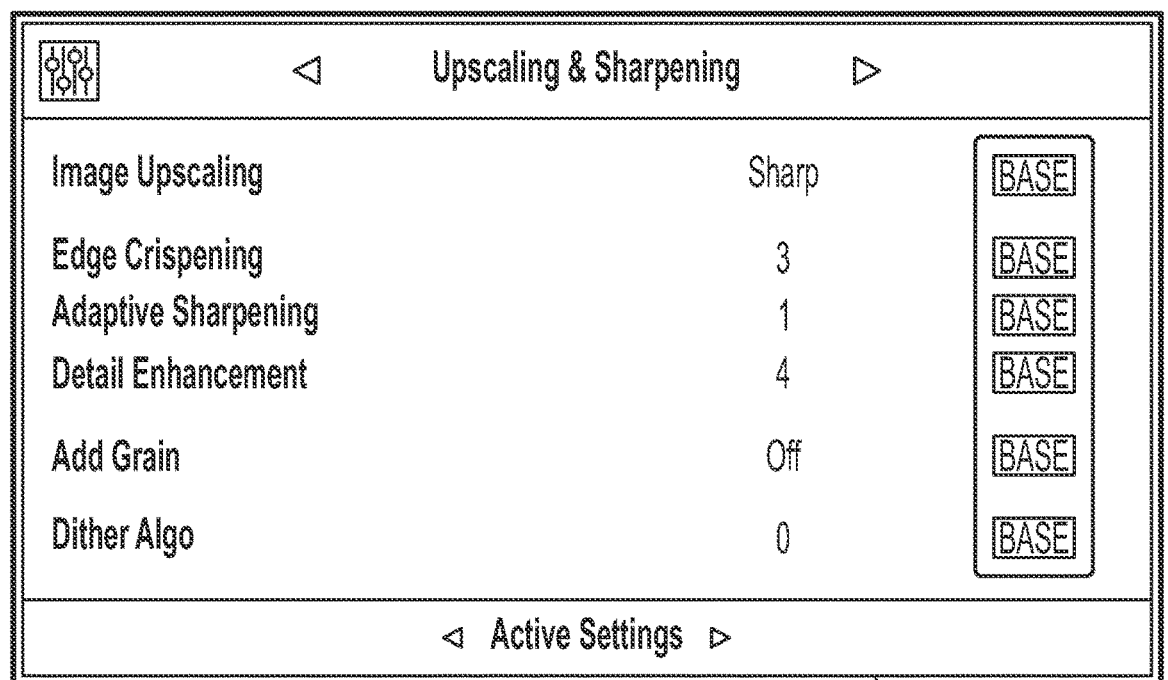
FIG. 6B is a diagram illustrating an upscaling and sharpening menu with active settings according to an example embodiment.

The Active Settings reflect the current settings in use by the system. Upscaling & Sharpening settings are now discussed, except this time, with the Active Settings option selected in the Profile Bar as shown at 610 in FIG. 6B.

Comparing this to the same menu page as described above, there are two key differences. First, Active Settings is selected in the Profile Bar instead of Base Settings. Therefore, the menu settings shown here are for the settings that are currently active, after any activated profiles and any temporary settings have been applied.

Second, the BASE tag next to each menu setting is an inheritance indicator. In general, menu tags indicate where each setting gets its value from. In this case, BASE indicates that the setting is inherited from the Base Settings and is not currently being overridden by any profiles or temporary settings. Base tags appear only when viewing Active Settings. Other menu tags are TEMP, PROF, SET and THRU. We discuss these tags in further examples below, starting with how temporary settings are handled.

Temporary Settings

The system makes it easy to temporarily change settings, without fear of losing preferred and trusted settings or fouling something up. Temporary settings are especially useful for changing something just for the current movie, or for experimenting with available options.

To make changes that are temporary, settings may be changed in the Active Settings. Since the Active Settings are the top-most layer in the profile hierarchy, any settings changed there are instantly applied and in effect.

Figure 7:
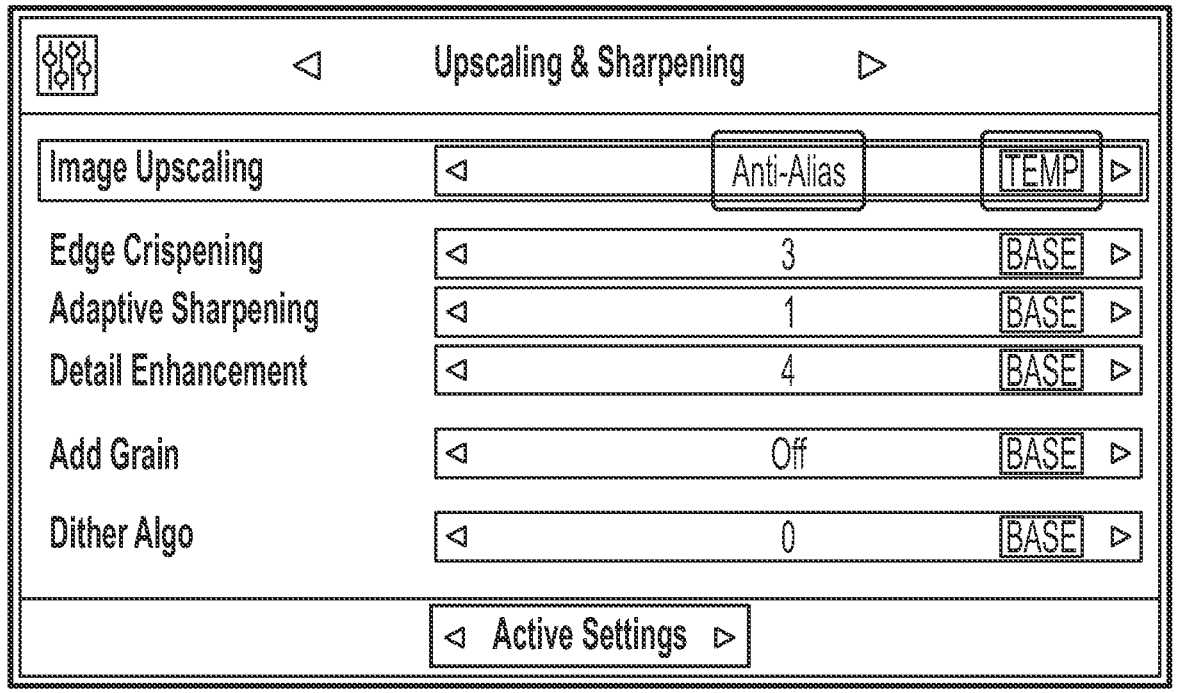
FIG. 7 is a diagram illustrating an upscaling and sharpening menu with an active anti-alias setting according to an example embodiment.

Continuing with the example from above—assume the user wants to experiment with the Image Upscaling setting, and change it in the Active Settings to "Anti-Alias", as shown at 700 in FIG. 7.

Notice how the tag for the Image Upscaling setting has now changed from BASE to TEMP. This is because the change was made while Active Settings was selected in the Profile Bar. The TEMP tag here indicates that this setting is being overridden temporarily, instead of being inherited from the Base Settings as before. TEMP tags only appear in the Active Settings (since that is the only place where temporary changes can be made).

Temporary settings are automatically reverted once there is an HDMI signal change, such as when a movie ends, and the player goes back to its main menu. Likewise, temporary settings also revert if HDMI inputs are changed, or the system is turned off or restarted.

Making Temporary Settings Permanent

To keep any temporary settings, the temporary settings may be saved to the Base Settings or to a profile before they revert.

Saving to the Base Settings

To save temporary settings so that they become the new system defaults, the temporary settings may be saved directly to the Base Settings. In one example, a save button on a system remote control or other user interface mechanism may be pressed while any temporary menu setting is highlighted.

Figure 8:
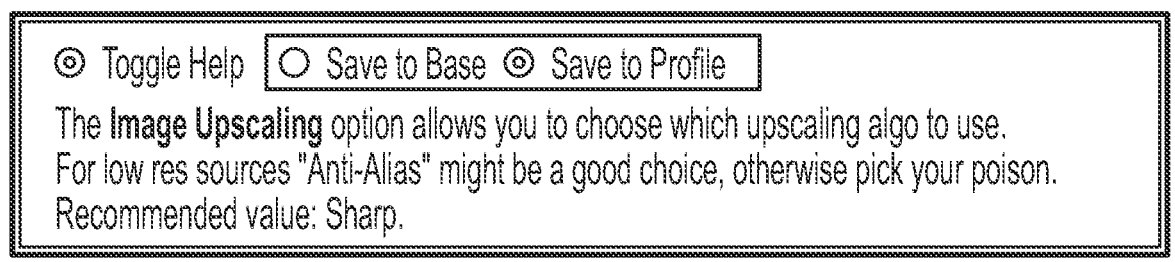
FIG. 8 is a diagram illustrating an image upscaling setting according to an example embodiment.

FIG. 8 at 800 shows the Image Upscaling setting that is highlighted and tagged as TEMP. Therefore, pressing the save button while on this line will save this new setting of "Anti-Alias" to the Base Settings.

Another way to update the Base Settings, without making the change in the Active Settings, is to select "Base Settings" in the profile bar, and then make the changes directly in the Base Settings. In practice the user will usually make the changes directly in the Active Settings and then use the Save to Base option, but either approach will work.

Saving to a Profile

Temporary settings can also be saved to a profile, so that they are used only when that profile is activated, and not as default settings as we did above.

For example, assume the user may experiment with an Anti-Aliasing option and find they prefer it over the Sharp option, but only for resolutions of 1080p and below. The system may be configured to automatically use the preferred Anti-Alias setting whenever the resolution was 1080p or below.

Figure 9:
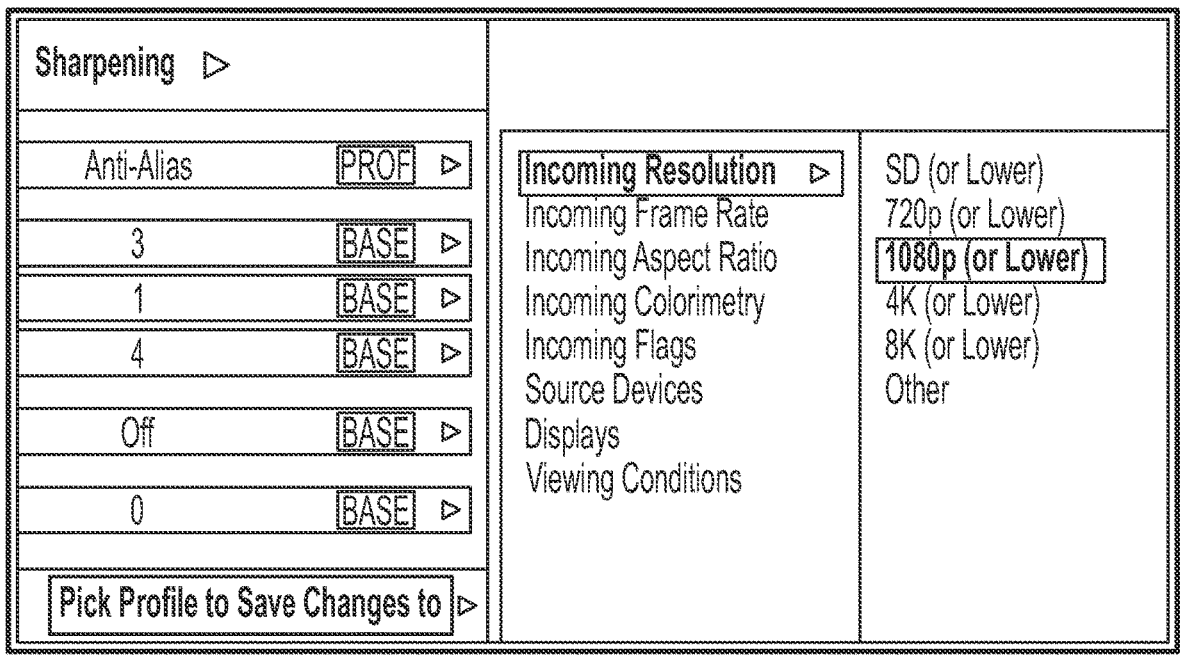
FIG. 9 is a diagram illustrating a menu to automatically use a preferred anti-alias setting according to an example embodiment.

To configure the system to automatically use the preferred Anti-Alias setting as shown at 900 in FIG. 9 whenever the resolution was 1080p or below, the "Image Upscaling" menu item may be highlighted, since it contains the temporary setting we wish to save. This will prompt the user to select the desired profile to save all temporary settings in this menu page to, as shown below. Select 1080p or lower. Now whenever the content is 1080p or lower, The system will automatically activate this profile and use the Anti-Alias setting. Otherwise, the Sharp setting will be inherited from the Base Settings.

More About Menu Tags

Given that a setting to a first profile has been saved, menu tags may be used, such as PROF, SET and THRU tags.

The PROF Tag

Continuing with the previous example—after saving the profile, the TEMP tag change to either BASE or PROF, depending on the current resolution of the incoming signal (recall that the system automatically activates predefined profiles based on the incoming signal. The PROF tag indicates when a profile is setting the value shown in the menu page. PROF tags only appear within the Active Settings.

If the system is currently receiving a 1080p or lower signal, the profile will activate automatically, and the menu page will look like what is shown below. Note the "Anti-Alias" setting and the PROF tags shown there, which indicate a profile (in this case, the 1080p or lower profile) is setting that value.

Figure 10:
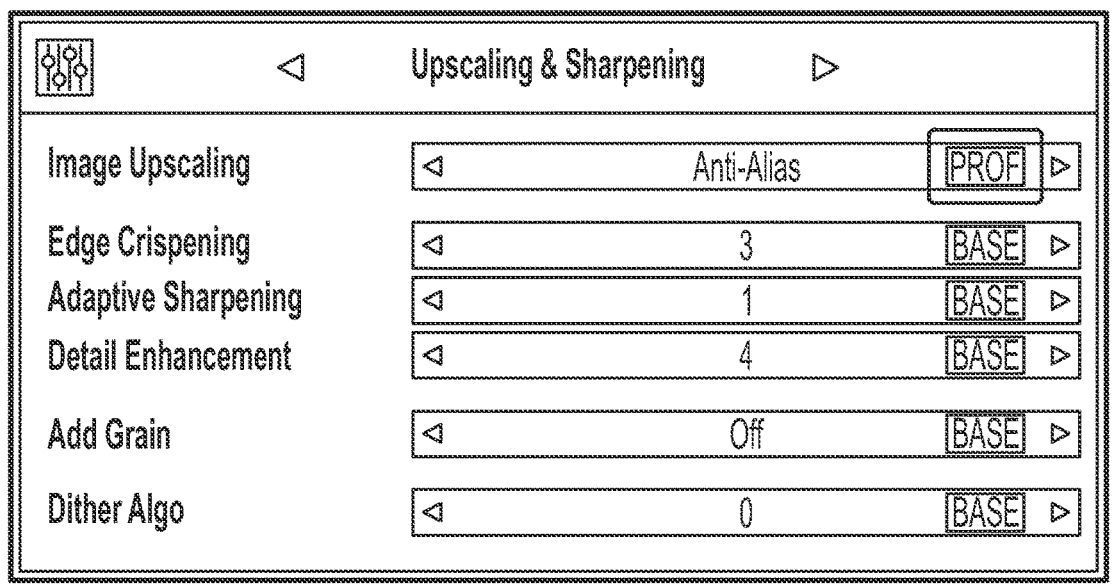
FIG. 10 is a diagram illustrating an example upscaling and sharpening menu having a setting of sharp according to an example embodiment.

If instead the system is receiving a 4K signal, then the Image Upscaling setting will appear as "Sharp" and the tag will show BASE, since the profile will not be activated. The next time a 1080p or lower signal is received, however, then the tag will show PROF and the setting will show "Anti-Alias" as shown at 1000 in FIG. 10.

In summary, menu settings tagged with PROF indicate that the values shown for those settings are being set by an activated profile. Since there are many possible profiles, however, it does not indicate which profile is the one setting the value.

The SET and THRU Tags

The PROF tag indicates when a menu item is being set by a profile. Naturally, this raises the question of which profile is the one setting the value. This may be determined by scrolling through the profiles associated with the menu page.

Figure 11:
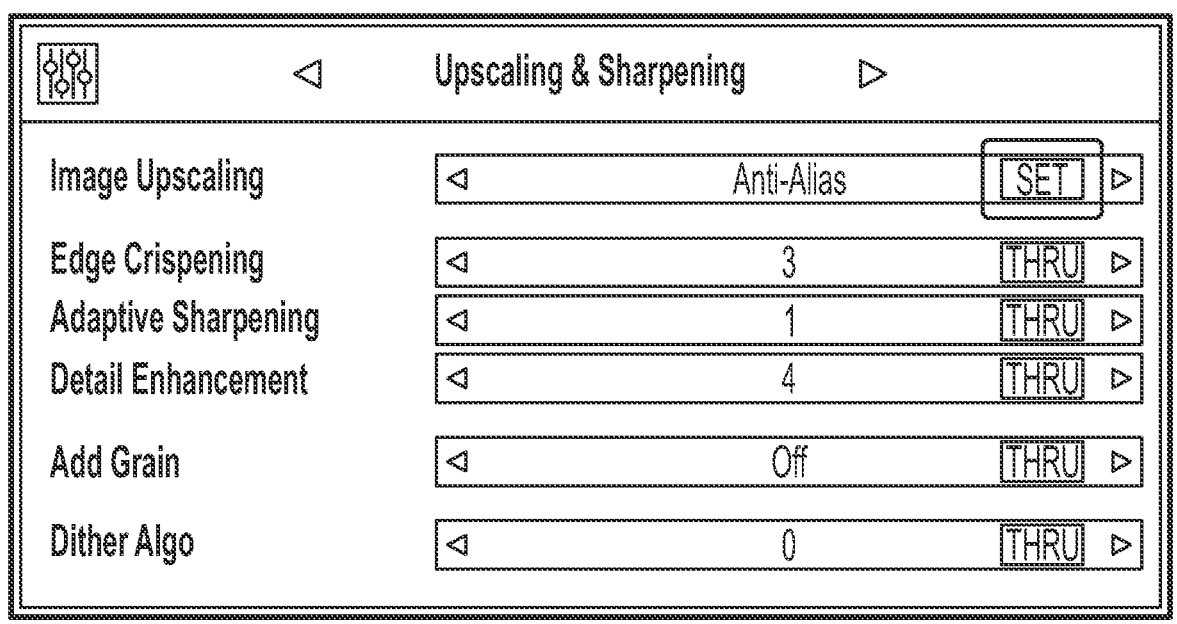
FIG. 11 is a diagram illustrating an example upscaling and sharpening menu having a set tag according to an example embodiment.

Scrolling may be done by moving to the Profile Bar and scrolling through the selections. In the example, Base Settings, Active Settings, and the "Incoming Resolution: 1080p (or Lower)" profile may be found. If this menu page had been included in other profiles, those other profiles would also appear here as shown at 1100 in FIG. 11.

With the Profile Bar set at "Incoming Resolution: 1080p (or Lower)" the menu page will appear as shown above. This profile appears as a selection in the Profile Bar because it was added as described above.

The SET tag also appears and indicates that this profile (since it is the one selected in the Profile Bar) "sets" the menu item to Anti-Alias—just if there is no other active profile with higher priority.

Any settings in a profile which that profile does not override are fully transparent. The THRU tag indicates the menu settings which are not set by the profile and just passed thru. Any setting tagged as THRU may be treated as if it did not even exist in the menu page for that profile. SET and THRU tags only appear in profiles.

Further note that values shown for any settings marked as THRU will reflect the values from the Active Settings. For example, if the Add Grain setting is temporarily changed in the Active Settings to 1, the Add Grain value shown in the profile view will be 1 instead of Off, since the setting is not used by the profile (it is THRU). When the temporary change reverts, the value will show Off.

Profile Priority

Given what we know about the highly transparent nature of profiles, and that any menu items not "SET" by the profile simply pass thru, this raises the question of how conflicts are treated. For example, what happens if a menu page exists in two different active profiles and has the same menu item set differently in each profile?

In the case of conflicting settings, profiles are applied in the following order of priority (from highest priority to lowest):

1. Any custom profiles you create.
2. "Source Devices" profiles.
3. "Displays" profiles.
4. Profiles based on properties of the incoming video signal.

Note that temporary changes made to the Active Settings have the highest priority, even overriding custom profile settings.

More Ways to Create and Manage Profiles

When doing extensive setup it may be convenient to first manually add menu pages to profiles, and then configure their settings, without using temporary settings. This section describes a few more examples of creating and managing profiles, except this time we set up the profiles manually.

When frequently configuring different systems, one system can be set up as desired with all desired custom profiles. The resulting configuration may be downloaded for use in additional system by uploading the configuration to each system.

Deleting a Menu Page from a Profile

The previously created profile may be deleted by navigating to the Upscaling & Sharpening menu page by scrolling within the Profile Bar until the "Incoming Resolution 1080p (or Lower)" selection is reached. A Context Sensitive Help window indicates that a delete button (it may be red in color) is assigned to "Remove Profile". Pressing the delete button may result in a "Yes" prompt, which may be selected to confirm that the file should be deleted.

Adding a Default Menu Page to a Profile

A default menu page may be added to a profile. In one example, two profiles are created for controlling Upscaling & Sharpening settings—one for 4K resolution, and the other for 1080p and lower resolution as shown at 1200 in FIG. 12.

To assign the settings for use with 4K resolution, the Upscaling & Sharpening menu is used by moving to the Profile Bar. An Add Profile feature may be selected, resulting in the following options:

Select "Incoming Resolution→4K (or Lower)". The default settings for the Upscaling & Sharpening menu page are then added to this profile. These settings will be overridden next.

Setting Values in a Profile

Figure 13:
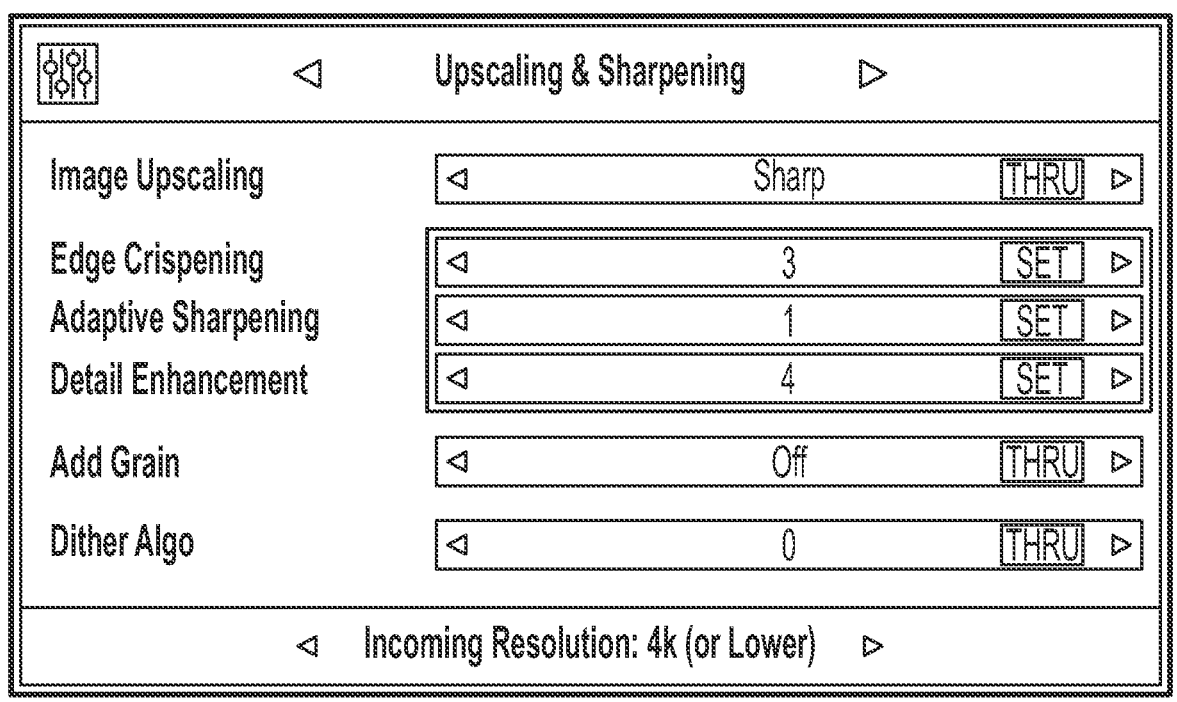
FIG. 13 is a diagram illustrating an example upscaling and sharpening menu having a resolution setting of 4K according to an example embodiment.

Notice in the image below how once the menu page is added to a profile, that profile is automatically selected in the Profile Bar. With this as the selected profile, it is known that changes are being made in the menu page for this profile. The settings to apply for 4K Upscaling & Sharpening may be configured as shown at 1300 in FIG. 13.

It is seen that three values were set. The indicator shows SET instead of THRU. This indicator indicates that the selected profile in the Profile Bar is setting these values. Whether that ultimately becomes the value used in the Active Settings depends on the profile being activated (in this case, a 4K signal needs to be present), and not conflicting with any higher priority active profiles. Note that the values that we did not override continue to show as THRU.

Figure 14:
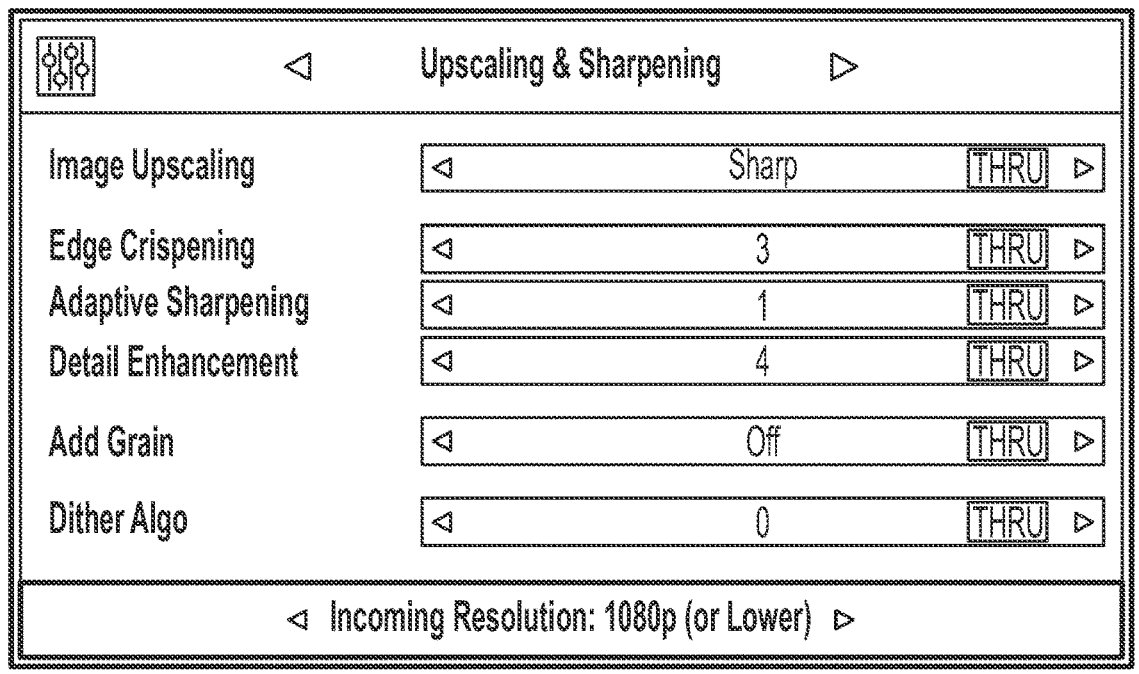
FIG. 14 is a diagram illustrating an example upscaling and sharpening menu having a new profile according to an example embodiment.

Next in this example, different Upscaling & Sharpening settings for 1080p signals are to be created. A new profile for 1080p and lower is created for this same menu page. The Profile Bar selected and the add profile feature is selected to add a new profile for 1080p or lower. The menu page now appear as shown in FIG. 14 at 1400.

Notice that new values from above (3, 1, 4) show with the THRU tag. This indicates that the currently selected profile (as shown in the Profile Bar) is not setting these values and these will be unaffected by this profile, if not set here.

Figure 15:
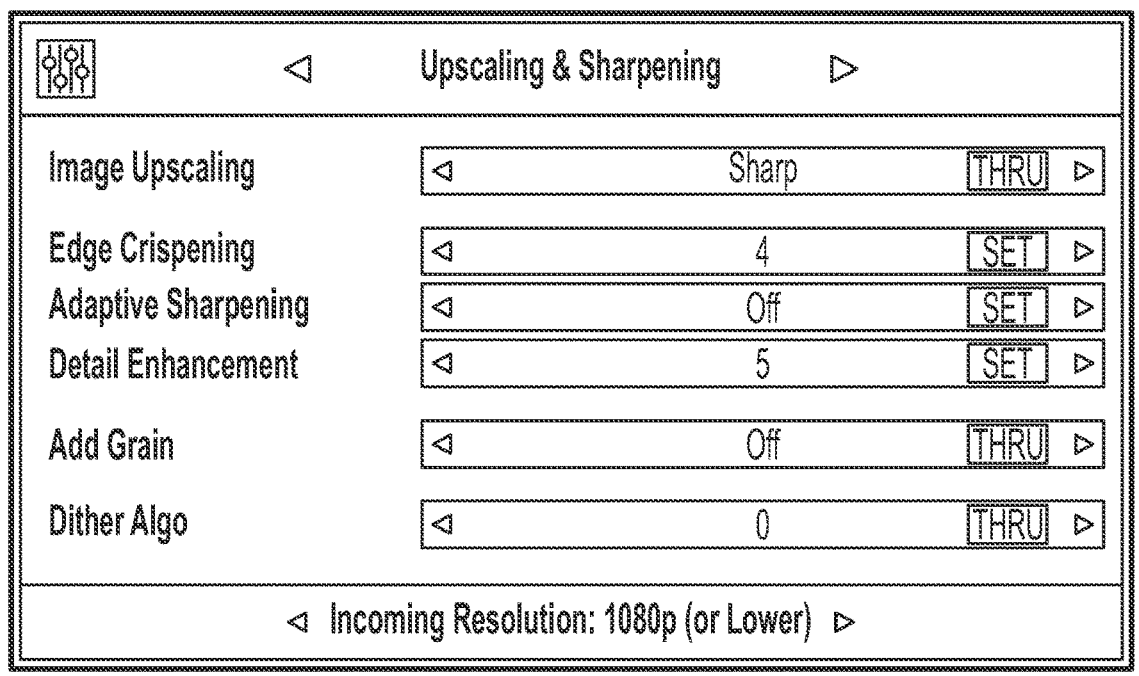
FIG. 15 is a diagram illustrating an example upscaling and sharpening menu having a new lower profile according to an example embodiment.

Now the settings to assign for the 1080p and lower profile may be configured. "Incoming Resolution: 1080p (or Lower)" is selected in the Profile Bar. Override these settings to 4, Off and 5. As before, the indicators change to SET to show that the selected Profile is "setting" these values, and the settings with THRU tags are unaffected. The menu page should now appear as shown in FIG. 15 at 1500.

Figure 16:
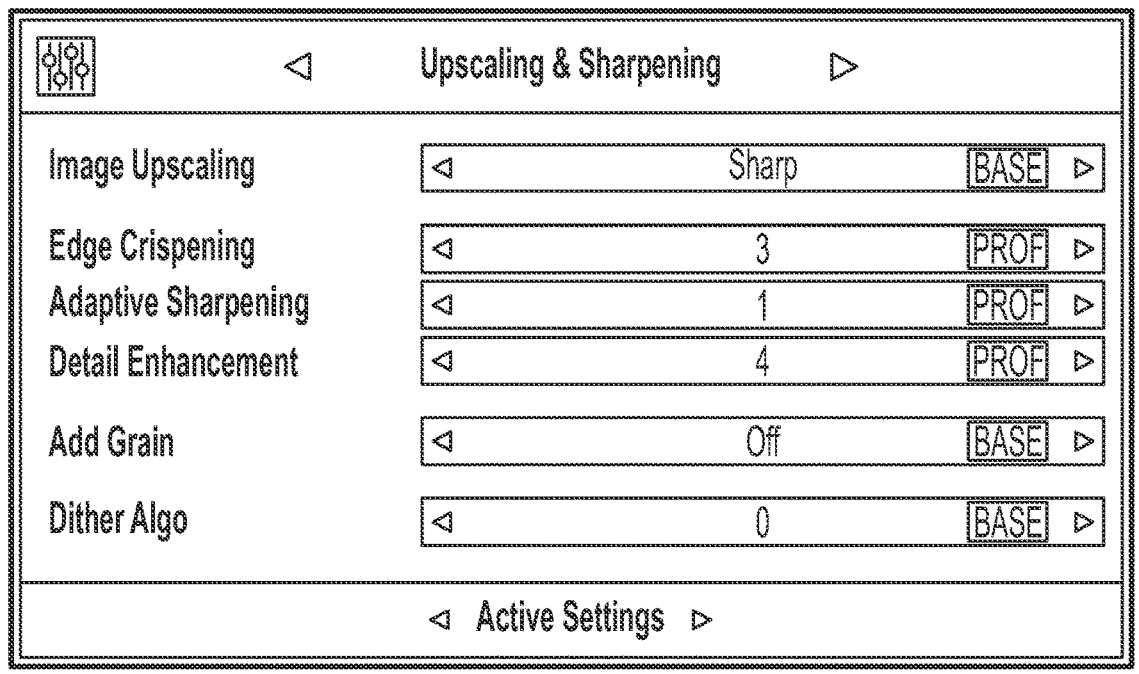
FIG. 16 is a diagram illustrating an example upscaling and sharpening menu having a profile corresponding to receiving a 4K signal according to an example embodiment.

Assume the system is currently receiving a 4K signal. Therefore, when Active Settings is selected in the Profile Bar will now appear as shown in FIG. 16 at 1600.

Notice how the menu page now shows the values of 3, 1 and 4, along with the PROF tags. This indicates that these values are being used because of an applied profile.

Figure 17:
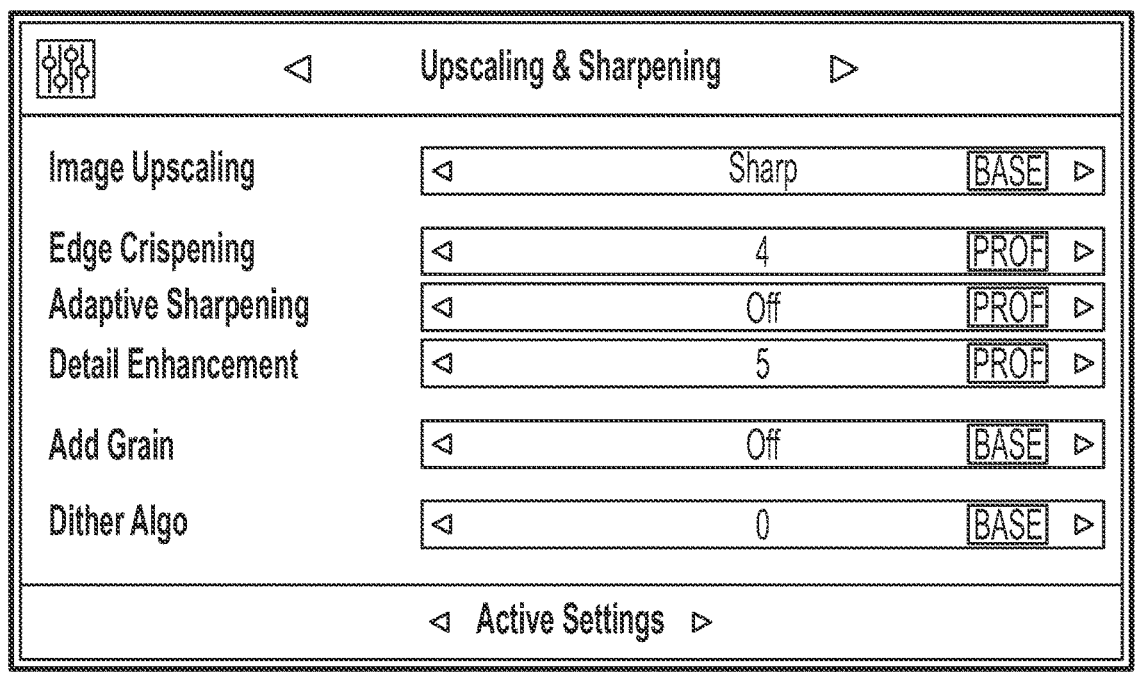
FIG. 17 is a diagram illustrating an example upscaling and sharpening menu having a profile corresponding to receiving a 1080p signal according to an example embodiment.

In response to a 1080p signal being received by the system, the menu page will now appear as shown in FIG. 17 at 1700.

Notice how the system has automatically recalled the Upscaling & Sharpening settings for 1080p, and that this shows as Active Settings. The PROF tags here indicate the settings are coming from an active profile—in this case, the profile added for 1080p or lower.

Recall that this profile is assigned for 1080p and lower. If even stronger Upscaling & Sharpening settings are desired for 720p and below, another profile may be created and added, based on a resolution of 720p or lower using the same steps as above when setting the 4K and 1080p profiles above.

Figure 18:
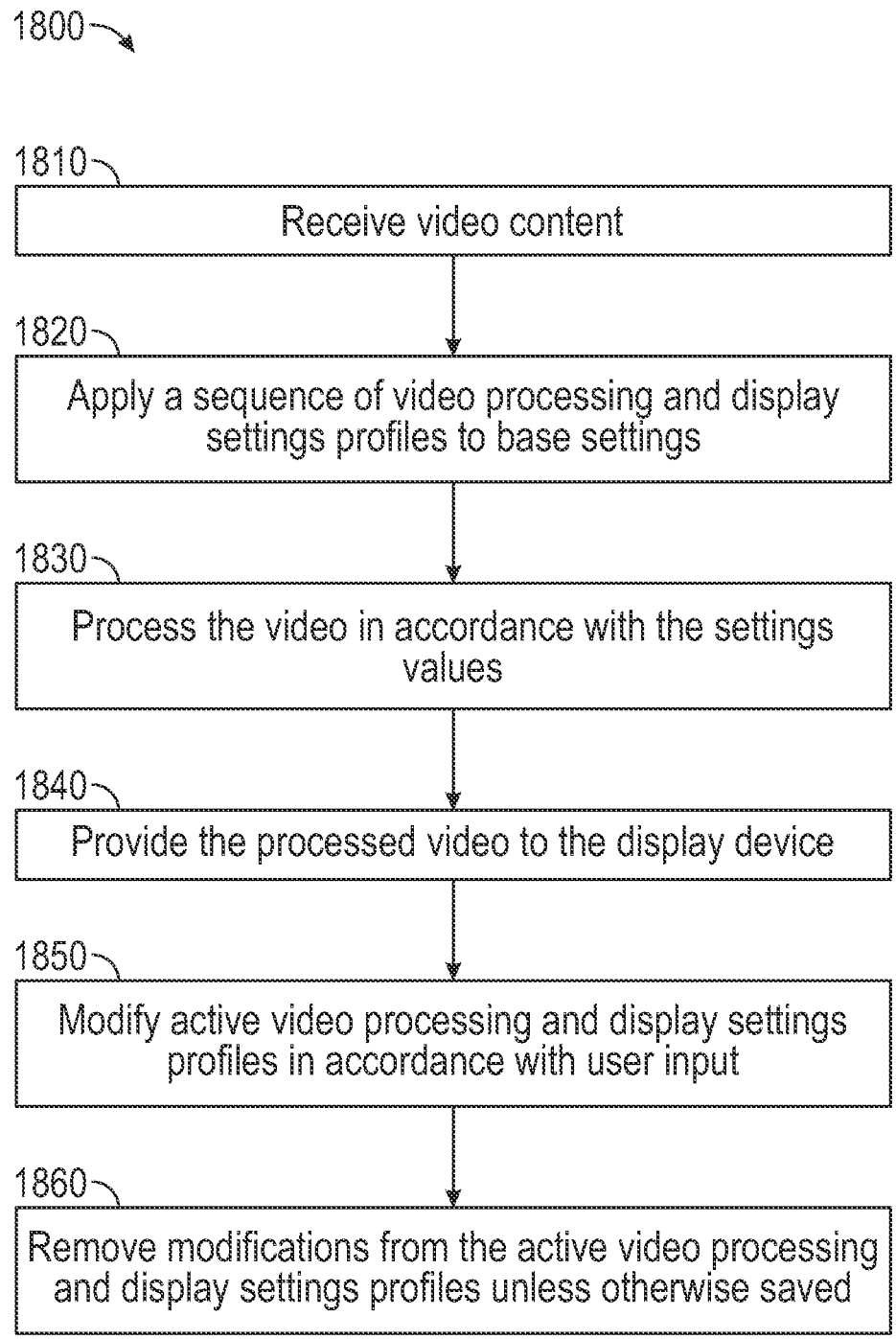
FIG. 18 is a flowchart illustrating a method of processing hierarchical profiles according to an example embodiment.

FIG. 18 is a flowchart illustrating a computer implemented method 1800 of processing hierarchical profiles according to an example embodiment. Method 1800 begins at operation 1810 by receiving video content to display on a display device. Operation 1820 applies a sequence of video processing and display settings profiles to base settings to derive video processing setting values and display setting values. The sequence of settings profiles may include a hierarchy of multiple settings profiles. The sequence of video processing and display settings profiles are applied based on video processing and display settings profile priorities.

Operation 1830 processes the video via the computer in accordance with the video processing and display settings values. Operation 1840 provides the processed video to the display device.

In one example, each video processing and display settings profile applied only modifies settings having values specified in the setting profile. The applied sequence of video processing setting values and display setting values may include video processing and display settings profiles indicated as active.

In one example, the video processing and display settings profiles are organized into groups, wherein only one video processing and display settings profile is active in any one group.

Method 1800 may modify active video processing and display settings profiles in accordance with user input at operation 1840 and may remove modifications from the active video processing and display settings profiles at operation 1850 unless otherwise saved.

In one example, a video processing and display settings profile for application of the sequence of video processing and display settings profiles may be set in response to receiving a video source indication.

In a further example, a video processing and display settings profile may be selected for application of the sequence of video processing and display settings profiles in response to receiving a video type indication.

Profile Flexibility and Conclusion

The use of hierarchical profiles provides power, flexibility, and ease of system use. To illustrate this even further, consider another scenario that shows just how easy it is to adapt profiles if the user later changes their mind about the settings.

If the user decides that they would like to use an "Add Grain" setting of 1 instead of Off, for all viewing conditions. No profiles that were already set up would need to be modified. This is because for all profiles, the Add Grain setting is not overridden, as you can tell from the THRU tag when each profile is viewed.

To make this change for the Add Grain setting, the user may go to the Base Settings and change the Add Grain setting there to "1". Profiles are fully transparent for all settings except those that are overridden. Therefore, the change to the Add Grain setting in the Base Settings will be passed all the way up the chain of profile layers, to the Active Settings, and applied to everything you watch.

If the user wanted the Add Grain setting of 1 to be used with all sources, except a setting of 2 when using an Oppo Blu-ray player, the user may simply add another profile to the Upscaling & Sharpening menu, this time for Source Device 1, corresponding to the Oppo Blu-ray player.

The Source Device 1 may be optionally renamed to "Oppo" and the Add Grain setting in the Profile changed to 2. Then when watching the Oppo, manually select the Oppo profile, or do so automatically.

Also, since Source Devices have higher signal profiles, when watching priority than incoming video the Oppo, the Add Grain setting of 2 will have priority over any Add Grain setting that may be added to the 1080p and 4K profiles previously created.

When watching any other source, choose Source Device→Disable Profiles. This disables only the profiles for Source Devices, so the Oppo Add Grain setting will not be used. Likewise, the user could activate Source Device 2 (or any other Source Device) with no settings in that profile to achieve the same result, since activating any profile within a profile group deactivates all other profiles in the group.

The profile system provides a powerful, flexible, and yet highly intuitive way to manage system video content processing and display settings.

Figure 19:
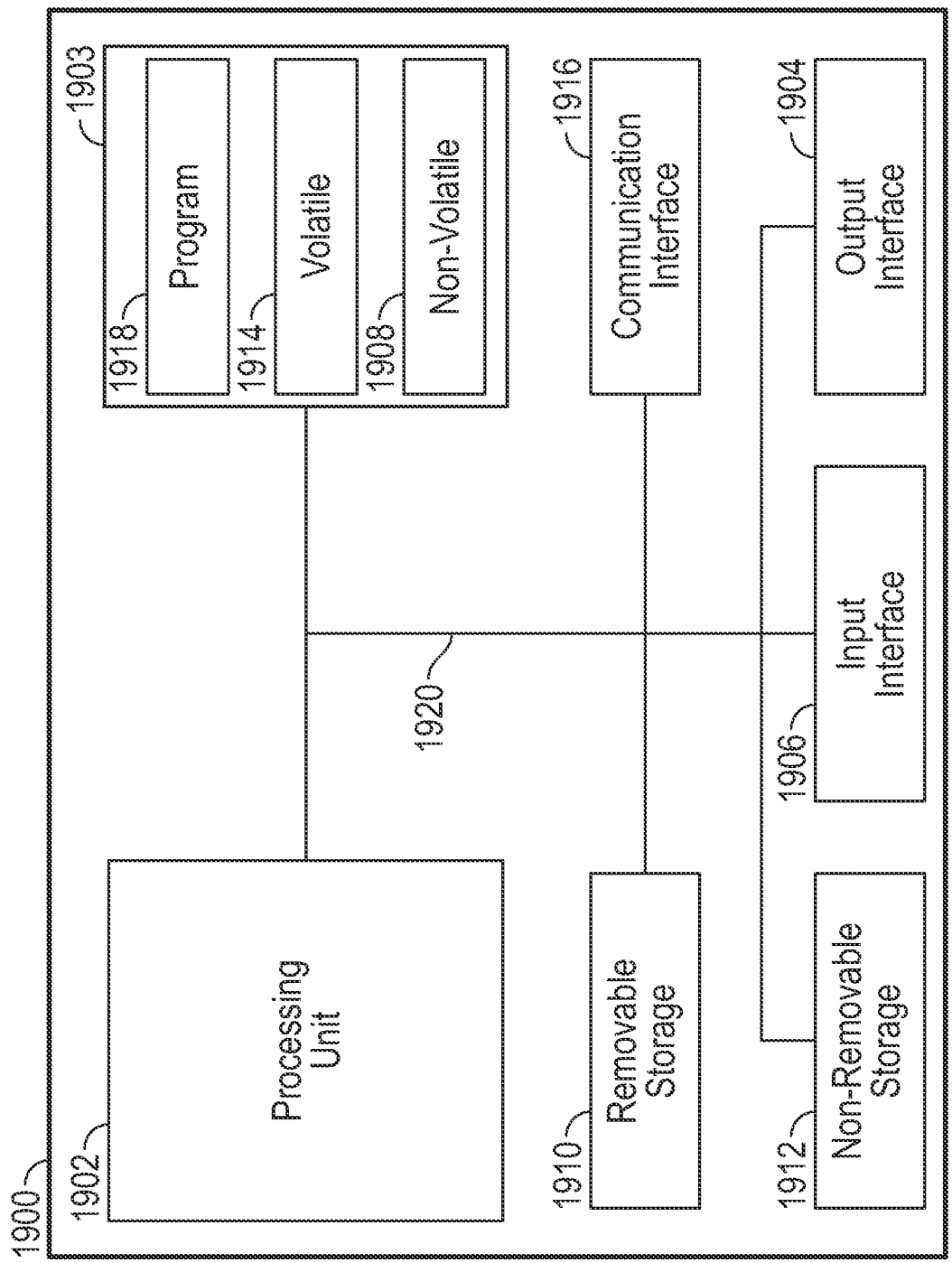
FIG. 19 is a block schematic diagram of a computer system to implement one or more example embodiments.

FIG. 19 is a block schematic diagram of a computer system 1900 to process and display video content in accordance with hierarchically applied settings profiles and for performing methods and algorithms according to example embodiments. All components need not be used in various embodiments.

One example computing device in the form of a computer 1900 may include a processing unit 1902, memory 1903, removable storage 1910, and non-removable storage 1912. Although the example computing device is illustrated and described as computer 1900, the computing device may be in different forms in different embodiments. For example, the computing device may instead be a smartphone, a tablet, smartwatch, smart storage device (SSD), or other computing device including the same or similar elements as illustrated and described with regard to FIG. 19. Devices, such as smartphones, tablets, and smartwatches, are generally collectively referred to as mobile devices or user equipment.

Although the various data storage elements are illustrated as part of the computer 1900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1903 may include volatile memory 1914 and non-volatile memory 1908. Computer 1900 may include—or have access to a computing environment that includes—a variety of computer-readable media, such as volatile memory 1914 and non-volatile memory 1908, removable storage 1910 and non-removable storage 1912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1900 may include or have access to a computing environment that includes input interface 1906, output interface 1904, and a communication interface 1916. Output interface 1904 may include a display device, such as a touchscreen, that also may serve as an input device. The input interface 1906 may include one or more of a touchscreen, touchpad, mouse, keyboard, camera, one or more device-specific buttons, one or more sensors integrated within or coupled via wired or wireless data connections to the computer 1900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1900 are connected with a system bus 1920.

Computer-readable instructions stored on a computer-readable medium are executable by the processing unit 1902 of the computer 1900, such as a program 1918. The program 1918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1918 along with the workspace manager 1922 may be used to cause processing unit 1902 to perform one or more methods or algorithms described herein.

EXAMPLES

1. A computer implemented method includes applying a sequence of settings profiles to base settings to configure a product.

2. The method of example 1 wherein the sequence of settings profiles comprises a hierarchy of multiple settings profiles.

3. The method of example 1 wherein the sequence of settings profiles are applied based on settings profile priorities.

4. The method of example 1 wherein each setting profile applied only modifies settings having values.

5. The method of example 1 wherein the applied sequence of video processing and display settings include settings profiles indicated as active.

6. The method of example 5 wherein settings profiles are organized into groups, wherein only one settings profile is active in any one group.

7. The method of example 5 and further including modifying active profiles in accordance with user input and removing modifications from the active profiles unless otherwise saved.

8. The method of example 1 and further comprising selecting a settings profile for application of the sequence of settings profiles in response to the product receiving data from an external source.

9. The method of example 1 and further comprising selecting a settings profile for application of the sequence of settings profiles in response to receiving a data type indication.

10. A machine-readable storage device having instructions for execution by a processor of a machine to cause the processor to perform operations to perform any of the methods of claims 1-9.

11. A device includes a processor and a memory device coupled to the processor and having a program stored thereon for execution by the processor to perform operations to perform any of the methods of claims 1-9.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving video content to display on a display device;
applying a sequence of video processing and display settings profiles to base settings based on video processing and display settings profile priorities to derive video processing setting values and display setting values;
processing the video via the computer in accordance with the video processing and display settings values; and
providing the processed video to the display device.

2. The method of claim 1 wherein the sequence of settings profiles comprises a hierarchy of multiple settings profiles.

3. The method of claim 1 wherein each video processing and display settings profile applied only modifies settings having values.

4. The method of claim 1 wherein the applied sequence of video processing setting values and display setting values include video processing and display settings profiles indicated as active.

5. The method of claim 4 wherein video processing and display settings profiles are organized into groups, wherein only one video processing and display settings profile is active in any one group.

6. The method of claim 4 and further comprising:
modifying active video processing and display settings profiles in accordance with user input; and
removing modifications from the active video processing and display settings profiles unless otherwise saved.

7. The method of claim 1 and further comprising selecting a video processing and display settings profile for application of the sequence of video processing and display settings profiles in response to receiving a video source indication.

8. The method of claim 1 and further comprising selecting a video processing and display settings profile for application of the sequence of video processing and display settings profiles in response to receiving a video type indication.

9. A machine-readable storage device having instructions for execution by a processor of a machine to cause the processor to perform operations to perform a method comprising:
receiving video content to display on a display device;
applying a sequence of video processing and display settings profiles to base settings based on video processing and display settings profile priorities to derive video processing setting values and display setting values;
processing the video via the computer in accordance with the video processing and display settings values; and
providing the processed video to the display device.

10. The device of claim 9 wherein the sequence of settings profiles comprises a hierarchy of multiple settings profiles.

11. The device of claim 9 wherein each video processing and display settings profile applied only modifies settings having values.

12. The device of claim 9 wherein the applied sequence of video processing setting values and display setting values include video processing and display settings profiles indicated as active.

13. The device of claim 12 wherein video processing and display settings profiles are organized into groups, wherein only one video processing and display settings profile is active in any one group.

14. The device of claim 12 and further comprising:
modifying active video processing and display settings profiles in accordance with user input; and
removing modifications from the active video processing and display settings profiles unless otherwise saved.

15. The device of claim 9 and further comprising selecting a video processing and display settings profile for application of the sequence of video processing and display settings profiles in response to receiving a video source indication.

16. The device of claim 9 and further comprising selecting a video processing and display settings profile for application of the sequence of video processing and display settings profiles in response to receiving a video type indication.

17. A device comprising:
a processor; and
a memory device coupled to the processor and having a program stored thereon for execution by the processor to perform operations to perform a method comprising:
receiving video content to display on a display device;
applying a sequence of video processing and display settings profiles to base settings based on video processing and display settings profile priorities to derive video processing setting values and display setting values;
processing the video via the computer in accordance with the video processing and display settings values; and
providing the processed video to the display device.

18. The device of claim 17 wherein the applied sequence of video processing setting values and display setting values include video processing and display settings profiles indicated as active.

19. The device of claim 18 and further comprising:
modifying active video processing and display settings profiles in accordance with user input; and
removing modifications from the active video processing and display settings profiles unless otherwise saved.

\* \* \* \* \*